Patented Jan. 23, 1951

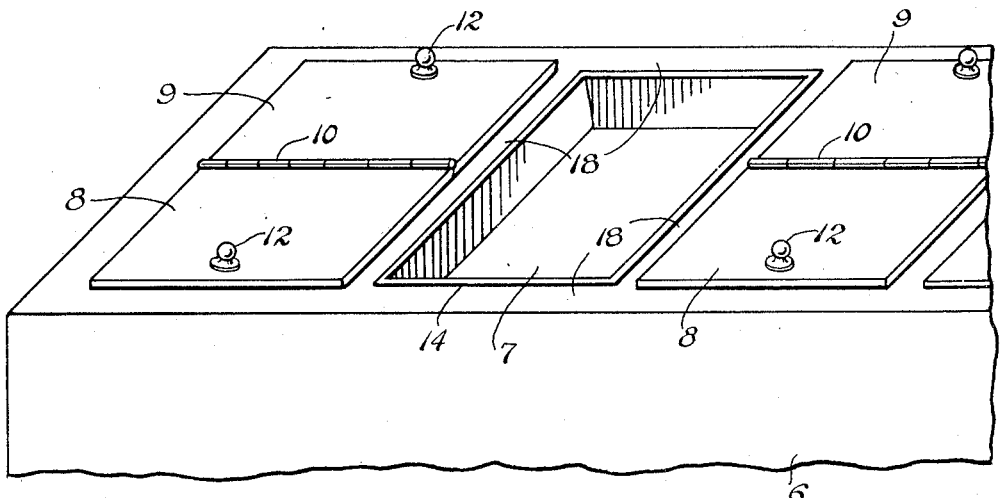
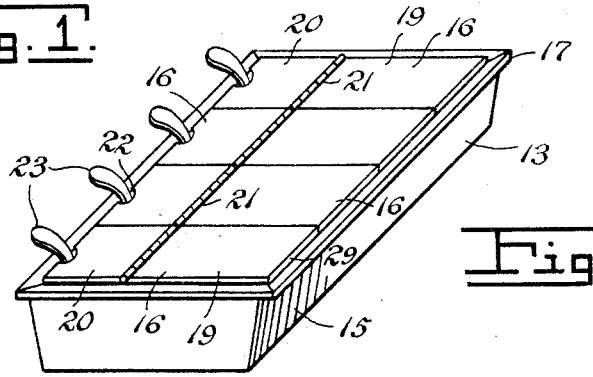
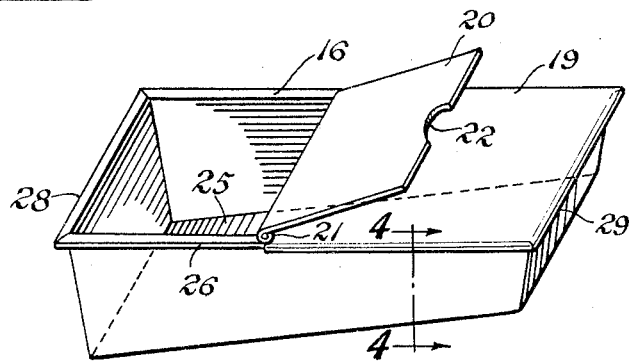
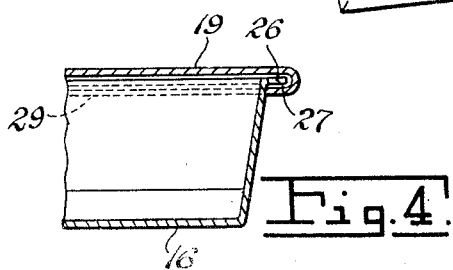

2,539,326

UNITED STATES PATENT OFFICE 2,539,326

ICE-CREAM CABINET ACCESSORY

Harold A. Quitter, Westchester, Ill.

Application June 7, 1947, Serial No. 753,195

1 Claim. (Cl. 220—17)

This invention relates to improvements in a syrup tray accessory for cooling and dispensing syrups or flavors in association with ice cream cabinets.

One of the objects of the invention is to provide economical means for cooling and dispensing syrups for use in ice cream parlors, drugstores, restaurants and the like.

Another object is to provide means whereby an ordinary ice cream cabinet may be utilized for storing and cooling syrups.

A further object is the provision of means whereby syrups for human consumption may be kept in a sanitary manner and in a location of ready accessibility for dispensing upon ice creams, ices, and other refreshments.

Another object is the provision of sanitary syrup trays simple of construction and economical of manufacture, and which conveniently may be associated with various types and makes of ice cream dispensing cabinets.

These and other objects and advantages are attained by the means described in the following specifications and illustrated upon the accompanying drawing, in which:

Fig. 1 is a fragmental perspective view of a conventional ice cream cabinet, with one of its lids completely removed therefrom.

Fig. 2 is a perspective view of a combination syrup tray for application to the exposed opening of the ice cream cabinet shown in Fig. 1.

Fig. 3 is perspective view of a container comprising part of the combination tray shown in Fig. 2.

Fig. 4 is a fragmental cross sectional view of a container taken on line 4—4 of Fig. 3.

Operators of ice cream parlors, confectioneries, and the like, often lack sanitary means for properly storing and dispensing syrups used in preparing sundaes and other ice cream combinations. Often the syrups are kept in an unsightly assortment of jars or cans, and exposed to warm room temperatures, thereby often causing fermentation or spoilage of the syrups.

The present invention obviates these disadvantages, as will be apparent to those skilled in the art to which this invention pertains.

Fig. 1 illustrates a conventional insulated ice cream cabinet 6 which has in its top a series of openings 7 usually closed by means of hinged insulated lids 8—9, the lids being hingedly connected in pairs as indicated at 10. By means of handles or knobs 12, either lid of a pair may be swung open to afford access to ice cream stored within the cabinet. It is usual for these cabinets to be provided with a multiplicity of lids and openings, as indicated, the openings being of a standard size.

The present invention contemplates completely removing a pair of lids 8—9, and substituting therefor a combination tray structure 13, such as Fig. 2 illustrates. The tray structure 13 comprises a pan 15 and a plurality of containers 16 disposed therein, in side-by-side relation.

As shown, the pan 15 has a circumferential flange 17, adapted to rest upon the margin 18 of the opening 7, the pan being substantially the same depth as the insulated lids or covers 8—9. The openings 7 of refrigerated ice cream cabinets are generally provided with circumferential flanged gaskets 14, the flange thereof extending about the marginal edge 18 of the openings. The flange 17 of the pan 15 may rest upon the flange of the gasket 14. The containers 16 are placed in the pan 15, in side-by-side relation, as shown in Fig. 2, each container being provided with a cover 19 having thereon a hinged lid 20, the hinging means being indicated at 21. The container lids 20 may be cut away, as at 22, to permit the handle 23 of a dispensing ladle to project therefrom. In order to cause the syrup in the containers to accumulate at the dispensing end thereof, as the supply of syrup nears depletion, each container 16 may be provided with an inclined bottom 25, as shown in Fig. 3, the deep end of the container, of course, being at the hinged lid end thereof, as illustrated. The bottoms of the containers 16 do not contact the bottom of the pan 15, thereby providing a dead air space therebetween, which acts as an insulator against loss of refrigeration from the ice cream cabinet.

The container cover portion 19 has a tongue and groove connection with the upper flange 26 of the container, as indicated in Fig. 4, in a free fit, so that the entire cover structure 19—20 may be slidably detached from the container 16 for ease in cleaning and sterilizing said container. As shown in Fig. 4, the margin of the cover portion 19 is turned upon itself to form the groove 27 which engages the flange 26. The forward flange 28 of the container and the extending inturned edge 29 of the cover 19 provide the means for supporting the containers 16 upon the upper edge of the pan 15.

The pan 15, resting within the ice cream cabinet opening 7, prevents undue loss of refrigeration from the cabinet, but since the tray structure is of metal, a sufficient amount of cold penetrates the pan 15 and keeps the various syrups in the containers 16 in cooled condition, thereby preventing spoilage by fermentation.

Thus it will be seen that the device of the present invention maintains flavored syrups in a sanitary condition, as well as presenting a neat and attractive appearance. The cooled syrup, dispensed from the combination syrup tray, improves the quality of the frozen refreshments served by the operator using this device. The simple construction of the combination syrup tray makes cleaning thereof an easy matter. The entire assembly may be fitted to existing cabinets, as well as to new cabinets made especially to accommodate it.

The covers of the several containers preferably abut along their side edges, to effect a substantial closure for the top of the tray 15. This feature minimizes loss of cold air maintained inside the tray and about the walls and bottoms of the several containers 16.

It is to be understood, of course, that various structural changes and modifications are possible within the scope of the appended claim, without departing from the spirit of the invention.

What is claimed is:

As an accessory for a refrigerated ice cream cabinet having a top opening, an open-topped tray having a bottom, side and end walls extending upwardly from said bottom, and a circumferential flange surrounding and extending outwardly from upper edges of said walls, the tray being adapted to extend into the cabinet opening with the flange resting on the top of the cabinet to close the cabinet opening, a plurality of containers disposed in said tray in side by side relation, each of said containers having a bottom sloping downwardly toward one side of the tray, side and end walls extending upwardly from said bottom, and a top closure having a hinged portion at said one side and adapted to afford access to the interior thereof, each of said containers having a pair of flanges extending outwardly in opposite directions from upper edges of said end walls and resting on the flange of the tray to support the containers in the tray with the top closures disposed in a common plane and the bottoms of the containers spaced above the bottom of the tray to form an air chamber between the bottom of the tray and the bottoms of the containers; the containers substantially closing the top of the tray.

HAROLD A. QUITTER.

REFERENCES CITED

The following references are of record in the file of this patent:

UNITED STATES PATENTS

| Number | Name | Date |
|---|---|---|
| 246,720 | Campbell | Sept. 6, 1881 |
| 998,708 | McCann | July 25, 1911 |
| 1,002,950 | Wise et al. | Sept. 12, 1911 |
| 1,724,378 | Stokstad | Aug. 13, 1929 |
| 1,978,565 | Cocks et al. | Oct. 30, 1934 |

FOREIGN PATENTS

| Number | Country | Date |
|---|---|---|
| 174,452 | Germany | Aug. 28, 1906 |